US012573705B2

(12) United States Patent
Muratsu et al.

(10) Patent No.: US 12,573,705 B2
(45) Date of Patent: Mar. 10, 2026

(54) ELECTRICITY STORAGE MODULE

(71) Applicant: Panasonic Intellectual Property Management Co., Ltd., Osaka (JP)

(72) Inventors: Jiro Muratsu, Okayama (JP); Hirotaka Ogino, Osaka (JP); Hiroshi Takasaki, Osaka (JP); Tatsuya Hirano, Osaka (JP); Keisuke Nagata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 543 days.

(21) Appl. No.: 18/005,980

(22) PCT Filed: Jul. 21, 2021

(86) PCT No.: PCT/JP2021/027249
§ 371 (c)(1),
(2) Date: Jan. 19, 2023

(87) PCT Pub. No.: WO2022/024895
PCT Pub. Date: Feb. 3, 2022

(65) Prior Publication Data
US 2023/0307773 A1　Sep. 28, 2023

(30) Foreign Application Priority Data
Jul. 31, 2020　(JP) ................................. 2020-130307

(51) Int. Cl.
*H01M 50/291* (2021.01)
*H01M 50/213* (2021.01)
(Continued)

(52) U.S. Cl.
CPC ....... *H01M 50/291* (2021.01); *H01M 50/213* (2021.01); *H01M 50/503* (2021.01); *H01M 50/55* (2021.01)

(58) Field of Classification Search
None
See application file for complete search history.

(56) References Cited

U.S. PATENT DOCUMENTS

| | | | |
|---|---|---|---|
| 2020/0176735 A1 | 6/2020 | Muratsu et al. | |
| 2020/0227698 A1 | 7/2020 | Muratsu et al. | |
| 2020/0395587 A1* | 12/2020 | Ryu ...................... | H01M 50/56 |

FOREIGN PATENT DOCUMENTS

| | | |
|---|---|---|
| CN | 110651379 A | 1/2020 |
| WO | 2019/044582 A1 | 3/2019 |
| WO | 2019/058938 | 3/2019 |

OTHER PUBLICATIONS

1 The EPC Office Action dated Nov. 28, 2024 for the related European Patent Application No. 21850568.3.
(Continued)

*Primary Examiner* — Jonathan Crepeau
(74) *Attorney, Agent, or Firm* — Rimon P.C.

(57) ABSTRACT

At least one cylindrical electricity storage device, and an upper holder for holding an upper end side of the electricity storage device are included. A positive electrode terminal and a negative electrode terminal are disposed on an upper end part of the electricity storage device, and the negative electrode terminal is positioned in the outer side than the positive electrode terminal in a radial direction of the electricity storage device. A negative electrode lead connected to the negative electrode terminal from the outer side in the radial direction is further included. The upper holder includes a restriction part positioned in the inner side than at least a part of the negative electrode lead. A bottom surface of the restriction part protrudes toward the lower part than the surface facing an end part of one side of the electricity storage device in the upper holder.

5 Claims, 9 Drawing Sheets

(51) Int. Cl.
    *H01M 50/503*       (2021.01)
    *H01M 50/55*        (2021.01)

(56)               References Cited

OTHER PUBLICATIONS

International Search Report of PCT application No. PCT/JP2021/027249 dated Sep. 28, 2021.
English Translation of Chinese Office Action dated Apr. 3, 2025 for the related Chinese Patent Application No. 202180058687.2.

* cited by examiner

ELECTRICITY STORAGE MODULE

CROSS-REFERENCE TO RELATED APPLICATIONS

This application is a U.S. national stage application of the PCT International Application No. PCT/JP2021/027249 filed on Jul. 21, 2021, which claims the benefit of foreign priority of Japanese patent application No. 2020-130307 filed on Jul. 31, 2020, the contents all of which are incorporated herein by reference.

TECHNICAL FIELD

The present disclosure relates to an electricity storage module.

BACKGROUND ART

Conventionally, an electricity storage module is known as a power source including a plurality of electricity storage devices. For example, an electricity storage module disclosed in Patent Literature 1 includes a plurality of cylindrical cells. Each of the cylindrical cells includes a sealing body as a positive electrode terminal and an outer covering can as a negative electrode terminal, and a negative electrode lead is joined to a shoulder part (caulked opening end) of the outer covering can.

CITATION LIST

Patent Literature

PTL 1: PCT International Publication WO2019/058938

SUMMARY OF THE INVENTION

In the above-mentioned electricity storage module, when a negative electrode lead is welded to a shoulder part of an outer covering can, in a case where the negative electrode lead extends toward the inside of the outer covering can in the radial direction, an insulation distance between the negative electrode lead and a sealing body may not be able to be kept. On the other hand, in order to keep the insulation distance between the negative electrode lead and the sealing body, when a length in the radial direction of a joining region between the negative electrode lead and the outer covering can is reduced, it is difficult to secure a sufficient joining region for joining.

Then, it is conceivable that an upper holder for holding an upper end part of an electricity storage device includes a restriction part positioned inside than at least a part of the negative electrode in the radial direction. However, when a gap is generated between the electricity storage device and the upper holder due to dimensional tolerance of the shape of the electricity storage device or the upper holder, or relative positional displacement between the electricity storage device and the upper holder, the negative electrode lead may slip under the restriction part.

The present disclosure has an object to provide an electricity storage module including an upper holder including a restriction part positioned inside than at least a part of a lead in the radial direction, and being capable of suppressing slipping of a negative electrode lead as the lead under the restriction part.

An electricity storage module according to one aspect of the present disclosure includes at least one cylindrical electricity storage device, and a holder for holding one side of the electricity storage device. The electricity storage device includes a first terminal and a second terminal on an end part of the one side, and the second terminal is positioned in an outer side than the first terminal in the radial direction of the electricity storage device. The electricity storage module further includes a lead connected to the second terminal from the outer side in the radial direction. The holder includes a restriction part positioned in an inner side than at least a part of the lead in the radial direction, and the restriction part includes a bottom surface protruding toward a lower part than a face facing the end face on the one side of the electricity storage device in the holder.

According to one aspect of the present disclosure, an upper holder includes a restriction part for restricting a negative electrode lead so that the negative electrode lead is positioned outside than a predetermined position in the radial direction, and slipping of the negative electrode lead under the restriction part can be suppressed.

DESCRIPTION OF EMBODIMENTS

Hereinafter, exemplary embodiments of the present disclosure are described with reference to drawings. The shapes, materials, and numbers described below are examples, and can be appropriately modified in accordance with specifications of electricity storage modules.

Figure 1:
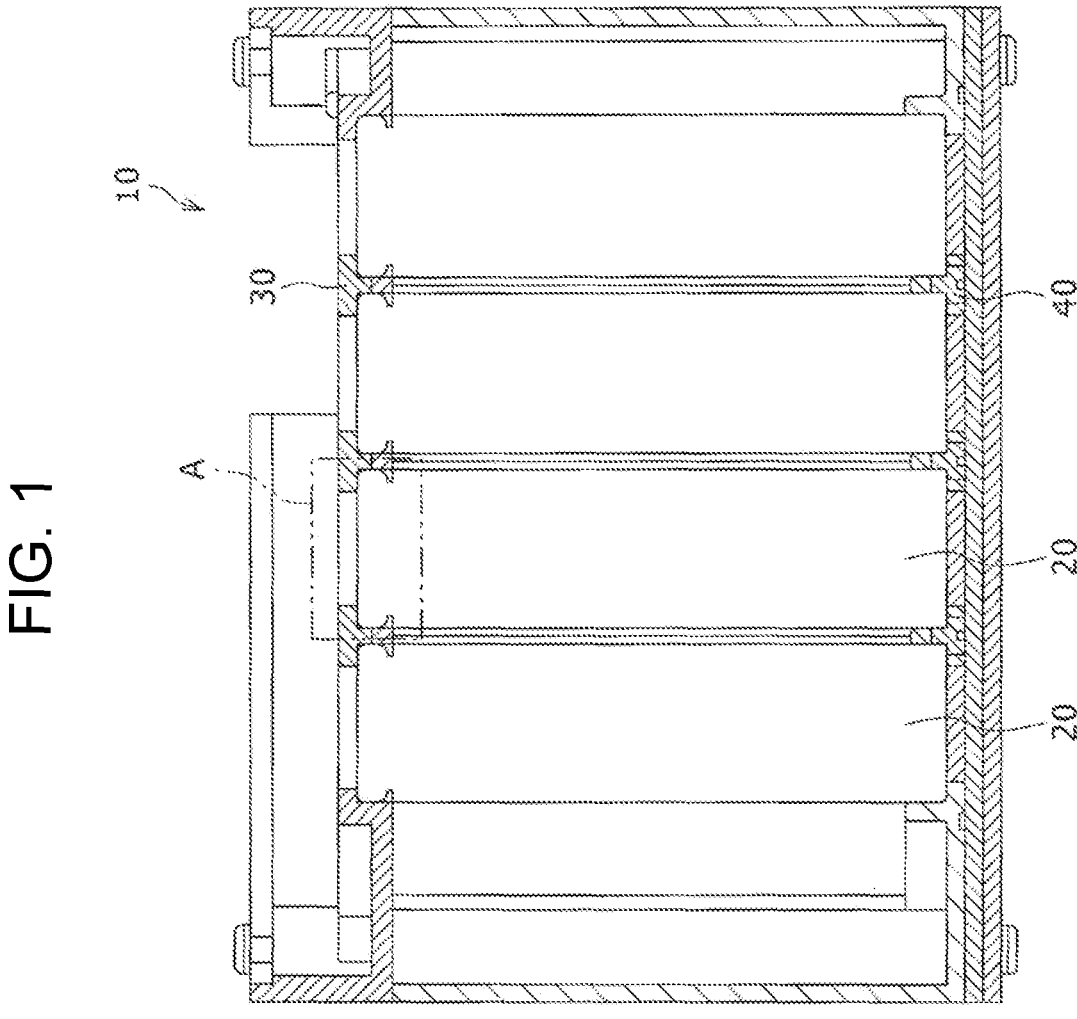
FIG. 1 is a side sectional view showing an electricity storage module as an example of a first exemplary embodiment.

With reference to FIG. 1, electricity storage module 10 of an example of one exemplary embodiment is described. FIG. 1 is a side sectional view showing electricity storage module 10. In the following, in electricity storage module 10 and electricity storage device 20, a side where upper holder 30 as a holder holds storage device 20 is described as the upper side in the vertical direction. However, the upper holder 30 side may be the lower side of electricity storage module 10.

Electricity storage module 10 is used primarily as a power source for power. Electricity storage module 10 is used as a power source for electrical devices such as an electric vehicle, an electric tool, an electric assisted bicycle, an electric motorcycle, an electric wheelchair, an electric tricycle, and an electric cart, driven by a motor. However, the applications of electricity storage module 10 are not limited, and electricity storage module 10 may be used as power sources for a variety of electrical devices used indoors and outdoors. Examples of the electrical devices include cleaners, radios, lighting devices, digital cameras, video cameras, and the like.

In FIG. 1, electricity storage module 10 includes a plurality of cylindrical electricity storage devices 20, upper holder 30 as a holder for holding near the upper ends of the plurality of electricity storage devices 20, lower holder 40 holding near the lower ends of the plurality of electricity storage devices 20, a first current collector (not shown) including a positive electrode lead connected to a first terminal (positive electrode terminal) of electricity storage device 20, and a second current collector (not shown) including negative electrode lead 50 (see FIG. 2) as a lead connected to a second terminal (negative electrode terminal) of electricity storage device 20. Upper holder 30 and negative electrode lead 50 are described later in detail later.

Figure 2:
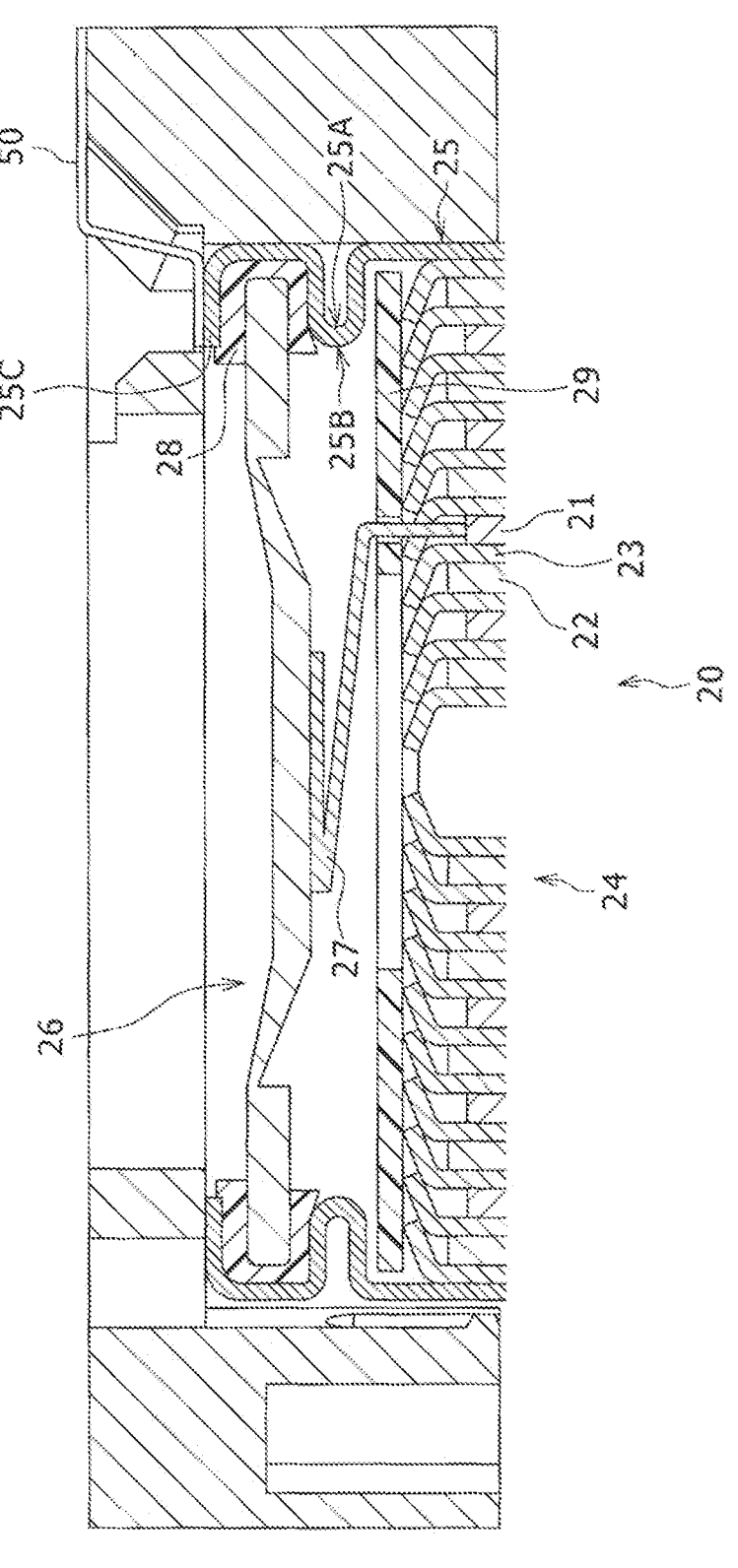
FIG. 2 is a detail view showing a part A taken from FIG. 1.

With reference to FIG. 2, electricity storage device 20 is described. FIG. 2 is a detail view of a part A of FIG. 1. In the following, each member is described according to the radial direction and the circumferential direction of the cylindrical shape of electricity storage device 20.

For electricity storage device 20, a cylindrical lithium ion secondary battery is used. Electricity storage device 20 is not limited to a lithium ion secondary battery, and may be a nickel metal hydride battery, a capacitor, and the like.

Although details are described later, electricity storage device 20 includes a positive electrode terminal as a first terminal and a negative electrode terminal as a second terminal in an upper end part. The negative electrode terminal is disposed outside than the positive electrode terminal in the radial direction. More specifically, the positive electrode terminal is disposed on a top surface of sealing body 26 mentioned later. Furthermore, the negative electrode terminal is disposed on a caulked opening end (hereinafter, shoulder part 25C) of outer covering can 25.

Electricity storage device 20 includes electrode group 24 including, for example, belt-like positive electrode 21 and belt-like negative electrode 22 wound with belt-like separator 23 sandwiched between positive electrode 21 and negative electrode 22; cylindrical outer covering can 25 housing electrode group 24 together with an electrolytic solution, sealing body 26 for sealing an opening of outer covering can 25 in an insulated state, foil-shaped positive electrode tab 27 for electrically connecting positive electrode 21 and sealing body 26 to each other, a negative electrode tab (not shown) for electrically connecting negative electrode 22 and outer covering can 25 to each other. Insulating gasket 28 is disposed between the outer periphery of sealing body 26 and an inner peripheral surface of the opening of outer covering can 25.

Annular groove 25A is formed on an outer peripheral surface of outer covering can 25 close to the opening. Groove 25A forms annular protrusion 25B on the corresponding inner peripheral surface of outer covering can 25. Gasket 28 and sealing body 26 are disposed on annular protrusion 25B inside outer covering can 25. Furthermore, shoulder part 25C of outer covering can 25 is caulked to fall toward the inner side of outer covering can 25 with gasket 28 disposed on the inner periphery side. When sealing body 26 is sandwiched between caulked shoulder part 25C and protrusion 25B via gasket 28 in the vertical direction, the opening of outer covering can 25 is sealed. Note here that shoulder part 25C is not necessarily limited to the above-mentioned configuration. For example, sealing body 26 may include a terminal plate in the middle thereof, and a conductive joining part disposed in the outermost periphery of sealing body 26 in an insulated state to the terminal plate, and the opening end and the joining part may be joined by welding to seal an opening of outer covering can 25. At this time, negative electrode lead 50 may be connected to the top surface of the joining part.

Sealing body 26 may be provided with a current interruption mechanism (CID), and an exhaust valve that ruptures when the pressure inside outer covering can 25 reaches a predetermined pressure or more. Furthermore, insulating plate 29 for insulating electrode group 24 from outer covering can 25 may be provided between electrode group 24 and protrusion 25B. When insulating plate 29 is provided, positive electrode tab 27 may extend through a through hole formed in insulating plate 29. Furthermore, an insulating plate may be provided between electrode group 24 and the bottom of outer covering can 25 for insulating electrode group 24 from outer covering can 25. The negative electrode tab may extend through the through hole formed in the insulating plate or around the insulating plate.

In electricity storage device 20, as described above, the top surface of sealing body 26 is provided with the positive electrode terminal to which a positive electrode lead connected to a positive electrode current collector foil is joined. Furthermore, in electricity storage device 20, as described above, the negative electrode terminal is formed on the caulked shoulder part 25C of outer covering can 25, and the negative electrode tab connected to a negative electrode current collector foil is joined to the bottom of outer covering can 25. Negative electrode lead 50 is joined to shoulder part 25C of outer covering can 25 from the outer side in the radial direction of electricity storage device 20.

Figure 3:
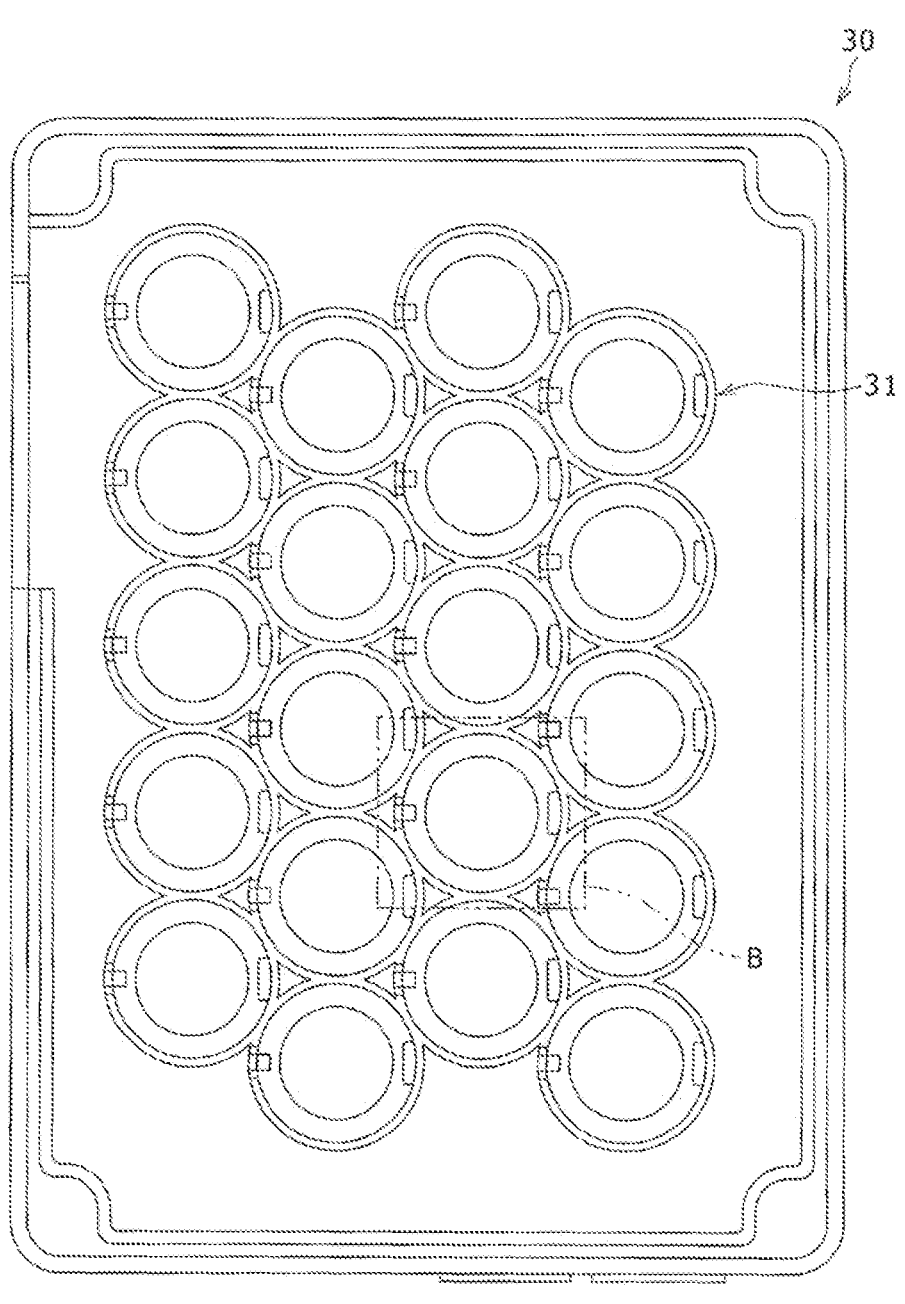
FIG. 3 is a plan view showing an upper holder viewed from below.
Figure 4:
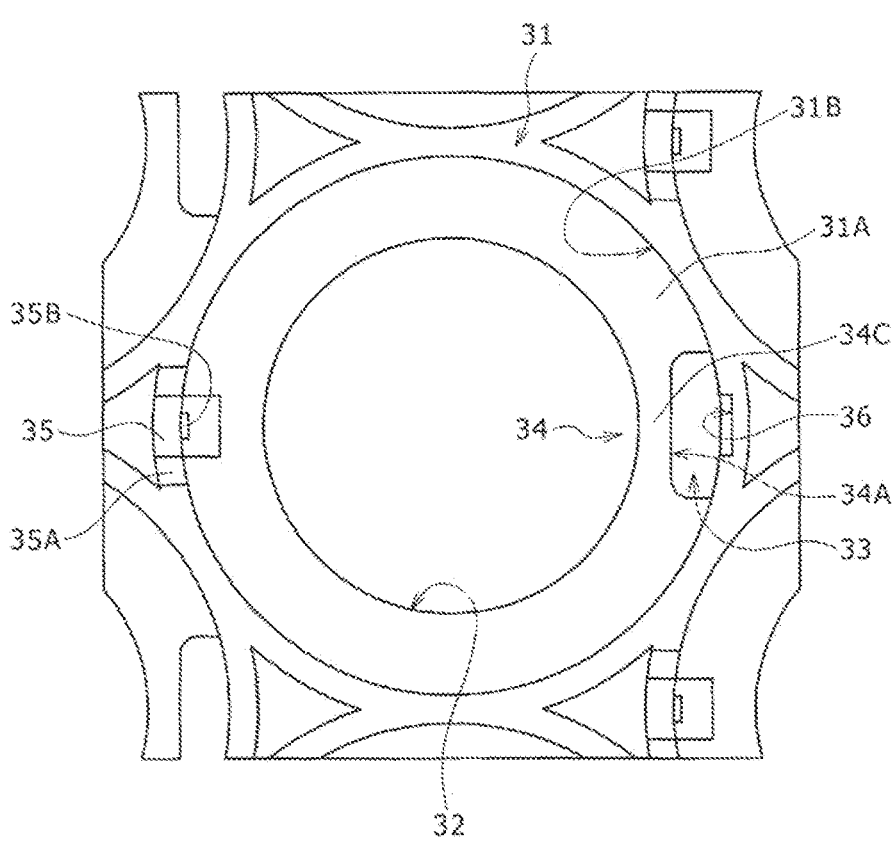
FIG. 4 is a detail view (plan view) showing a part B taken from FIG. 3.
Figure 5:
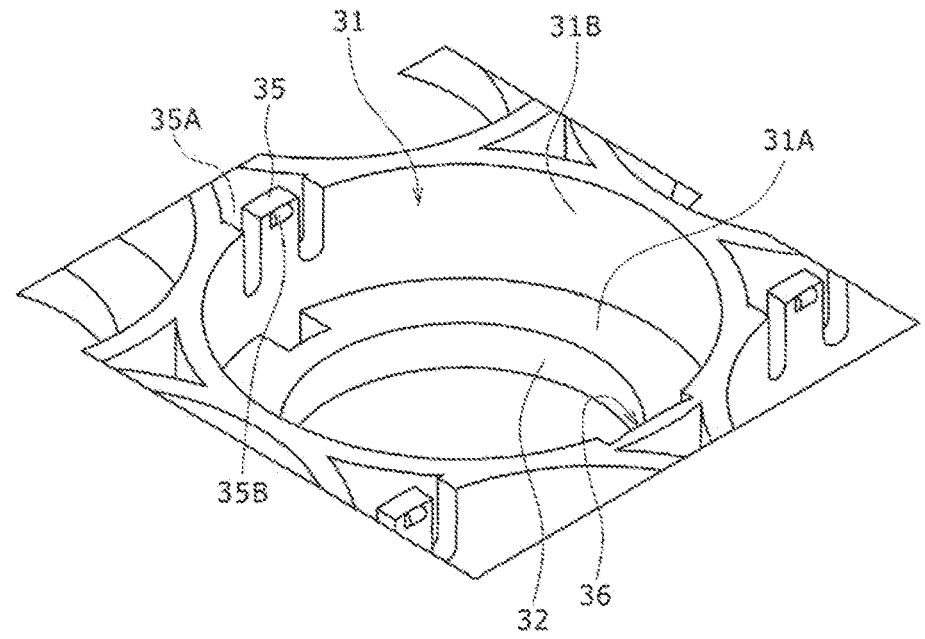
FIG. 5 is a perspective view of the part B of FIG. 3 viewed from below.
Figure 6:
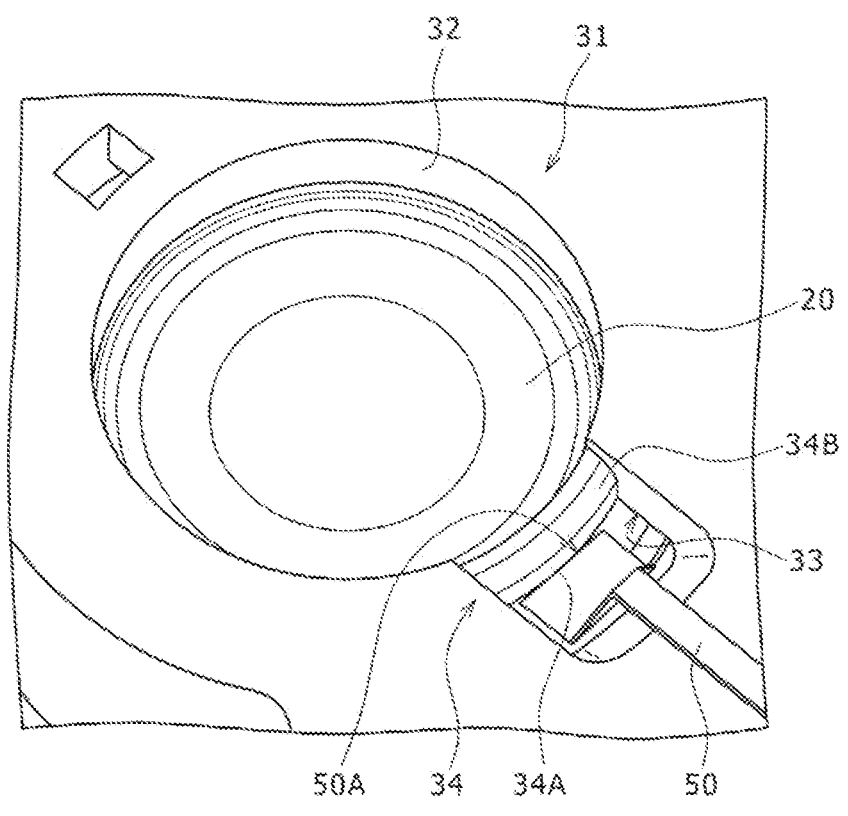
FIG. 6 is a perspective view of a housing part of the upper holder and a negative electrode lead viewed from above.
Figure 7:
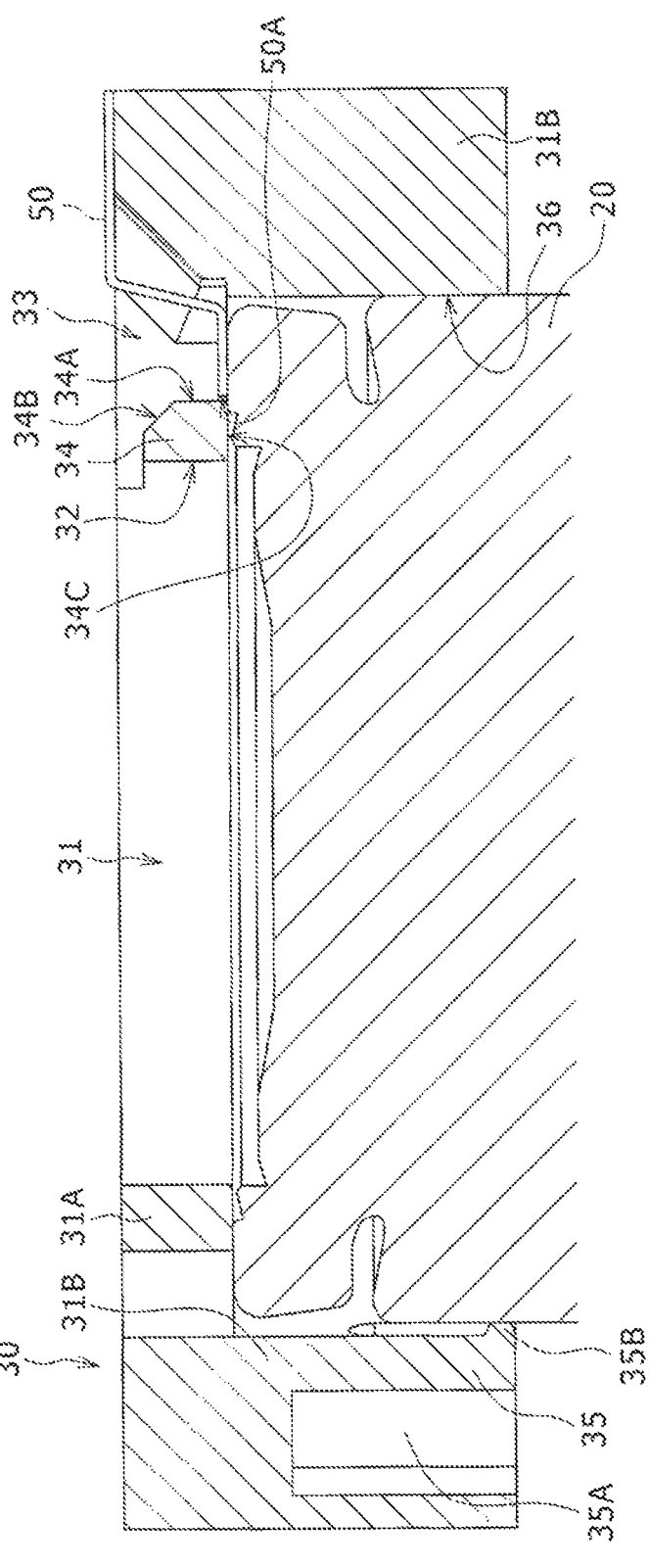
FIG. 7 is a side sectional view of the upper holder.

With reference to FIGS. 3 to 7, upper holder 30 is described. FIG. 3 is a plan view of upper holder 30 viewed from below. FIG. 4 is a detail view (plan view) showing a part B taken from FIG. 3. FIG. 5 is a perspective view of the part B of FIG. 3 viewed from below. FIG. 6 is a perspective view of housing part 31 of upper holder 30 viewed from above. FIG. 7 is a side sectional view of upper holder 30.

Upper holder 30 is a member for holding near upper ends of a plurality of electricity storage devices 20. Upper holder 30 is formed of a thermoplastic resin. Thermoplastic resins, broadly classified into general purpose plastics and engineering plastics, include polyethylene, polypropylene, polyamide, ABS, and the like. On the top surface of upper holder 30, a first current collector and a second current collector may be arranged in the direction in which the top surface of upper holder 30 expands. The first current collector may include a plurality of positive electrode leads, and may electrically connect a plurality of electricity storage devices 20. The second current collector may include a negative electrode lead and be connected to the plurality of negative electrode terminals of electricity storage devices 20, and may electrically connect a plurality of electricity storage devices 20. Furthermore, the first current collector and the second current collector may be stacked to each other with an insulating plate interposed therebetween.

FIG. 3 shows a bottom surface of upper holder 30 including a plurality of housing parts 31 each hosing a corresponding one of the upper end sides of electricity storage devices 20. When each of the upper end sides of electricity storage devices 20 is fitted into a corresponding one of housing parts 31, the upper end sides of electricity storage devices 20 are held in upper holder 30.

In, FIGS. 4 to 7, one of housing parts 31 is formed on the bottom surface of upper holder 30 as a recess including ceiling part 31A having a bottom surface facing the upper end surface of electricity storage device 20, and wall part 31B having an inner peripheral surface facing the side peripheral surface of electricity storage device 20.

Housing part 31, around thereof, includes opening part 32 for allowing the top surface of sealing body 26 of electricity storage device 20 to be exposed from the upper surface of holder 30, cut-out section 33 for allowing shoulder part 25C of outer covering can 25 of electricity storage device 20 to be exposed from the upper surface of upper holder 30, and restriction part 34 positioned inside than at least a part of negative electrode lead 50 in the radial direction of electricity storage device 20.

Opening part 32 is a circular opening part in ceiling 31A of housing 31. Opening part 32 has a diameter smaller than the inner diameter of wall part 31B. With opening part 32, the top surface of sealing body 26 of electricity storage device 20 is exposed from the upper surface of upper holder 30. Therefore, the top surface of sealing body 26 and a positive electrode lead can be jointed to each other via opening part 32. Furthermore, the bottom part of ceiling part 31A may be brought into contact with electricity storage device 20.

Cut-out section 33 is a part formed by cutting out a part of the edge of opening part 32. With cut-out section 33, a part of shoulder part 25C of outer covering can 25 of electricity storage device 20 can be exposed from the upper surface of upper holder 30. At the edge of cut-out section 33 in the upper surface of upper holder 30, a sloping part falling toward the inside in the radial direction of electricity storage device 20 is preferably formed. This can reduce stress applied to the negative electrode lead when negative electrode lead 50 is bent and brought into contact with shoulder part 25C. Therefore, when negative electrode lead 50 is joined to shoulder part 25C of outer covering can 25, a connector, a jig, or the like, is allowed to be adjacent to negative electrode lead 50, thus improving workability. Furthermore, the top surface of restriction part 34 may be positioned in the lower position than the top surface of a region provided with cut-out section 33 of upper holder 30. This configuration makes it possible to house negative electrode lead 50 inside cut-out section 33 more easily.

As described above, restriction part 34 is a part positioned inside than at least one part of negative electrode lead 50 in the radial direction of electricity storage device 20. In other words, restriction part 34 is a part for restricting negative electrode lead 50 so that negative electrode lead 50 does not move to inside than a predetermined position in the radial direction. The predetermined position is preferably the inner end position (opening end position of outer covering can 25) in the radial direction of shoulder part 25C of outer covering can 25 of electricity storage device 20. However, in the present invention, with restriction part 34 mentioned above, entire negative electrode lead 50 may not be positioned in shoulder part 25C (outside the top surface of sealing body). A part of negative electrode lead 50 may be overlapped to each other without being brought into contact with the top surface of the sealing body. Furthermore, needless to say, a configuration in which negative electrode lead 50 is within a window formed by restriction part 34 and cut-out section 33 is included.

Restriction part 34 is formed to be positioned inside in the radial direction of cut-out section 33, and to be bridged over the surface on both sides in the circumferential direction of cut-out section 33 (part connected to the both ends of cut-out section 33 in ceiling part 31A). In a state in which outside surface 34A of restriction part 34 and negative electrode lead

50 are brought into contact with each other or are slightly apart from each other in the radial direction of electricity storage device 20, negative electrode lead 50 may be joined to shoulder part 25C of outer covering can 25.

When restriction part 34 restricts negative electrode lead 50 such that negative electrode lead 50 is positioned outside than the predetermined position in the radial direction, the insulation distance between the top surface (positive electrode terminal) of sealing body 26 of electricity storage device 20 and negative electrode lead 50 can be secured. Furthermore, when conductive foreign matter enters from the outside of upper holder 30, the risk of short circuit between the top surface of sealing body 26 and negative electrode lead 50 can be reduced.

In addition, since restriction part 34 can secure the insulation distance to the top surface of sealing body 26, it is not necessary to reduce a length of negative electrode lead 50 in the radial direction in considering the insulation distance to the top surface of sealing body 26. Thus, the length of negative electrode lead 50 in the radial direction can be sufficiently increased. This makes it possible to secure a joining region of negative electrode lead 50 and shoulder part 25C (negative electrode terminal) of outer covering can 25 of electricity storage device 20.

Restriction part 34 includes sloping part 34B formed from the upper surface toward the outside surface 34A, and falling in the radial direction of electricity storage device 20, and is lowered toward the outside. Sloping part 34B makes it easy to house negative electrode lead 50 in cut-out section 33 using a connector, a jig, or the like, when negative electrode lead 50 is brought into contact with shoulder part 25C for joining negative electrode lead 50 to shoulder part 25C of outer covering can 25.

Furthermore, restriction part 34 has bottom surface 34C. Bottom surface 34C may be brought into contact with electricity storage device 20. Thus, negative electrode lead 50 or a foreign matter can be prevented from slipping into a part under restriction part 34, that is, a gap between electricity storage device 20 and restriction part 34. Furthermore, bottom surface 34C may be brought into contact with shoulder part 25C. With this configuration, in electricity storage device 20, only shoulder part 25C is exposed from the inside of cut-out section 33. Thus, as compared with a configuration in which restriction part 34 is disposed inside of electricity storage device 20 than shoulder part 25C in the radial direction, a short circuit of negative electrode lead 50 can further be suppressed.

In FIGS. 4 to 7, wall part 31B of housing part 31 includes pressing part 35 for pressing a side peripheral surface of electricity storage device 20 toward the side where restriction part 34 is formed, and supporting part 36 for supporting the side peripheral surface of electricity storage device 20.

Pressing part 35 and supporting part 36, in housing part 31 of upper holder 30, can press storage device 20 toward the side where supporting part 36 is formed in the radial direction and allow storage device 20 to be unevenly located in a direction pressed by pressing part 35 while the dimension variations in the radial direction of upper holder 30 and storage device 20 and the relative displacement between upper holder 30 and storage device 20 are absorbed. Therefore, it is possible to suppress insufficient exposure of shoulder 25C from the window defined by cut-out section 33 and restriction part 34 due to dimensional tolerance and assembly tolerance of electricity storage device 20 and upper holder 30. Then, poor joining between shoulder part 25C and negative electrode lead 50 due to insufficient exposure can be suppressed. Note here that a configuration including only pressing part 35 without including supporting part 36 can suppress variations of exposure of shoulder part 25C from cut-out section 33 as compared with a configuration not including pressing part 35.

Pressing part 35 is a part that is in a position facing restriction part 34 in the circumferential direction and presses the side peripheral surface of outer covering can 25 of electricity storage device 20 toward the side where restriction part 34 is formed in the circumferential direction. Pressing part 35 presses electricity storage device 20 in the radial direction toward the side where restriction part 34 and support part 36 are formed. Pressing part 35 and restriction part 34 may be arranged opposite to each other with electricity storage device 20 sandwiched therebetween. However, pressing part 35 need not necessarily be in a position symmetrical to the center axis of upper holder 30 as long as a pressing force is generated toward restriction part 34.

Pressing part 35 is formed to extend downward from a ceiling surface of recess 35A formed on the edge of wall part 31B of housing part 31. Therefore, pressing part 35 is positioned inside recess 35A or is adjacent to recess 35A. Such a configuration facilitates unitarily molding of the pressing part formed on upper holder 30. Furthermore, the upper surface of upper holder 30 may be provided with a through hole in a position adjacent to pressing part 35 when viewed in a plan view of upper holder 30. The through hole facilitates unitarily molding of pressing part 35 using a die. A tip part of pressing part 35 includes protrusion 35B protruding inward in the radial direction of electricity storage device 20. Protrusion 35B protrudes inward in the radial direction than wall part 31B of housing part 31 as viewed in a plan view. Furthermore, a plurality of pressing parts 35 may be provided for one housing part 31.

Supporting part 36 is a part supporting the side peripheral surface of outer covering can 25 of electricity storage device 20 in the position substantially the same as the position of restriction part 34 in the circumferential direction. Supporting part 36 is formed in wall part 31B of housing part 31 in a groove shape in the vertical direction. Supporting part 36 supports a side peripheral surface of outer covering can 25 of electricity storage device 20 by bringing the groove-shaped opening edge of wall part 31B of housing part 31 into contact with the side peripheral surface of electricity storage device 20. At this time, in wall part 31B, the inner peripheral surface facing electricity storage device 20 and the side peripheral surface of electricity storage device 20 have different curvatures from each other. With the difference in the curvatures, a part of electricity storage device 20 housed in supporting part 36 can be brought into contact with the opening edge more reliably. Examples of the method for making curvatures different include a method for making a diameter of the inner peripheral surface of wall part 31B be different from a diameter of the side peripheral surface of electricity storage device 20.

The shape of supporting part 36 is not necessarily limited to a groove shape in the vertical direction. For example, supporting part 36 may be formed as two protrusions such as ribs formed to protrude from wall part 31B of housing part 31 inward and formed in the vertical direction. In this case, each protrusion is brought into contact with the side peripheral surface of electricity storage device 20 to support the side peripheral surface of outer covering can 25 of electricity storage device 20. Furthermore, a plurality of supporting parts 36 may be provided in wall part 31B. Furthermore, supporting parts 36 may not be positioned in substantially the same positions in the circumferential direction of the electricity storage device. Supporting parts 36 may be apart from each other in the circumferential direction.

Figure 8:
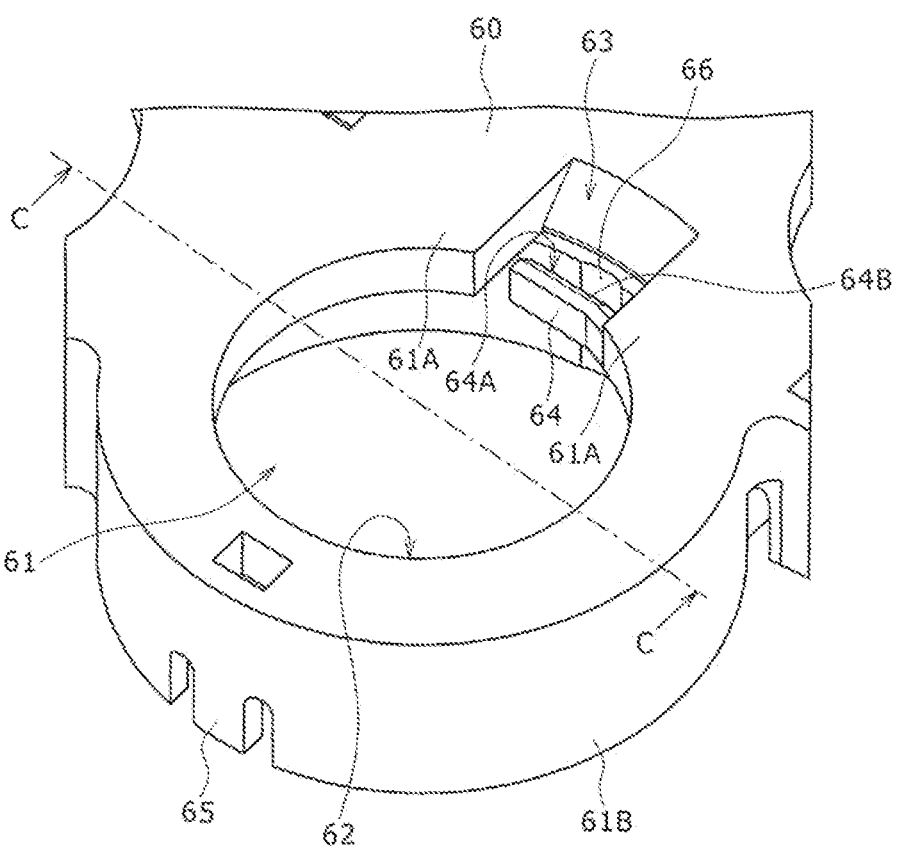
FIG. 8 is a perspective view of an upper holder of an electricity storage module as another example of the exemplary embodiment viewed from above.
Figure 9:
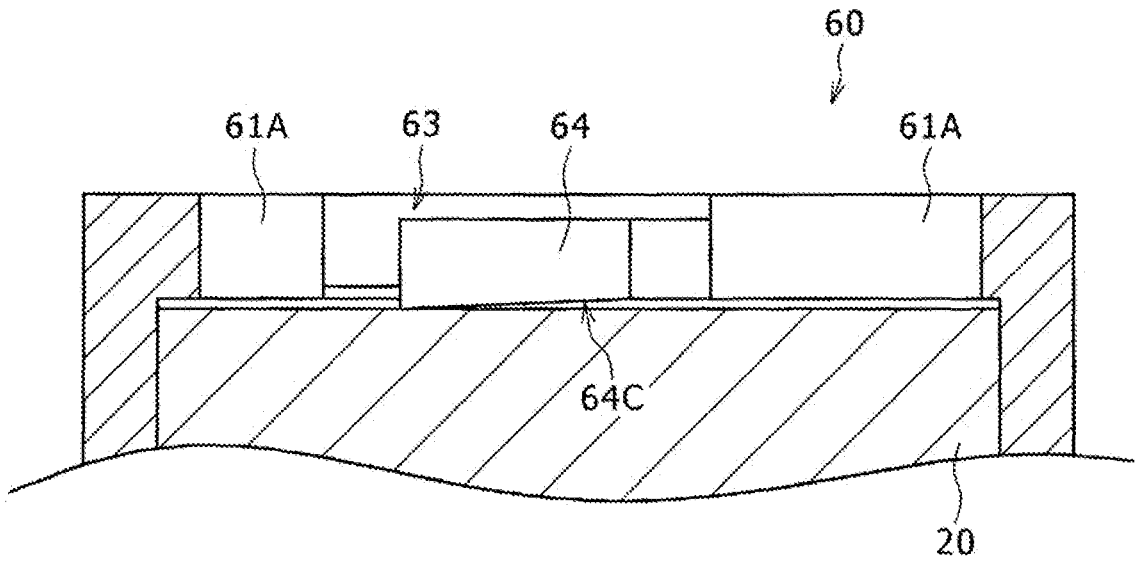
FIG. 9 is a sectional view taken on CC of FIG. 8.

With reference to FIGS. 8 and 9, upper holder 60 of electricity storage module 10 as another example of the exemplary embodiment is described. FIG. 8 is a perspective view of housing part 61 of upper holder 60 viewed from above. FIG. 9 is a sectional view taken on CC of FIG. 8. FIG. 9 does not show a shape of electricity storage device 20.

As mentioned above, upper holder 30 is a member for holding a plurality of the upper end sides of electricity storage devices 20. Since in upper holder 60, parts other than restriction part 64 have the same configurations as those described for upper holder 30, only restriction part 64 is described in the following. Specifically, housing part 61, opening part 62, cut-out section 63, pressing part 65, and supporting part 66 formed in upper holder 60 have the same configurations as those of housing part 31, opening part 32, cut-out section 33, pressing part 35, and supporting part 36 formed in the above-described upper holder 30.

Restriction part 64 is inside than at least a part of negative electrode lead 50 in the radial direction of electricity storage device 20. In other words, restriction part 64 restricts negative electrode lead 50 so that negative electrode lead 50 does not move to inside than a predetermined position in the radial direction. The predetermined position is preferably the inner end position in the radial direction of shoulder part 25C of outer covering can 25 (opening end position of outer covering can 25) of electricity storage device 20.

In FIGS. 8 and 9, restriction part 64 is formed to extend from one ceiling part 61A in which cut-out section 63 is formed inside in the radial direction of cut-out section 63. In other words, restriction part 64 is formed in cut-out section 63 as a cantilever beam having a tip part as a free end. A gap between the tip part of restriction part 64 and ceiling part 61A at the other end is preferably smaller than the length of restriction part 64.

Negative electrode lead 50 may be joined to shoulder part 25C of outer covering can 25 in a state in which outside surface 64A of restriction part 64 and tip part 50A of negative electrode lead 50 (see FIG. 6) are brought into contact with each other or slightly apart from each other in the radial direction of electricity storage device 20.

Similar to the above-described restriction part 34, restriction part 64 can secure an insulation distance between a top surface (positive electrode) of sealing body 26 of electricity storage device 20 and negative electrode lead 50, and can secure a joining region between negative electrode lead 50 and shoulder part 25C (negative electrode) of outer covering can 25 of electricity storage device 20.

Restriction part 64 includes sloping part 64B formed from the upper surface toward outside surface 64A. This facilitates housing negative electrode lead 50 in cut-out section 33 using a connector, a jig, or the like, in joining negative electrode lead 50 to shoulder part 25C of outer covering can 25.

Furthermore, restriction part 64 includes bottom surface 64C inclined downward toward the tip. Restriction part 64 is formed such that a position of bottom surface 64C near the tip of restriction part 64 in the vertical direction is positioned in the lower part than the position of ceiling part 61A in the vertical direction. Thus, restriction part 64 comes into active contact with the top surface of electricity storage device 20. Therefore, restriction part 64 can suppress slipping of negative electrode lead 50 into between restriction part 64 and electricity storage device 20.

For example, when a gap is generated between electricity storage device 20 and ceiling part 61A of upper holder 60 by relative positional displacement between electricity storage device 20 and upper holder 60 due to the dimensional tolerance of the shape or assembly tolerance of electricity storage device 20 or upper holder 60, the position of bottom surface 64C near the tip of restriction part 64 in the vertical direction is positioned in the lower part than the position of ceiling part 61A in the vertical direction. Therefore, bottom surface 64C of restriction part 64 is brought into contact with electricity storage device 20, and negative electrode lead 50 can be prevented from slipping under restriction part 64.

On the other hand, when a gap is not generated between electricity storage device 20 and ceiling part 61A of upper holder 60, since restriction part 64 is formed extending from one ceiling part 61A, the tip side of restriction part 64 is in a state slightly bent toward the upper side. Therefore, bottom surface 64C of restriction part 64 is brought into contact with electricity storage device 20, and negative electrode lead 50 can be prevented from slipping under restriction part 64. Note here that, in restriction part 64, bottom surface 64C at the tip part side protrudes downward. However, bottom surface 64C at the root side of restriction part 64 may protrude downward. Furthermore, when restriction part 64 is bent, regardless of whether being the tip side or the root side, an entire part of bottom surface 64C of restriction part 64 may protrude. Furthermore, when restriction part 64 is bent, restriction part 64 may not have a cantilever beam shape, and may have a shape with both sides supported.

Figure 10:
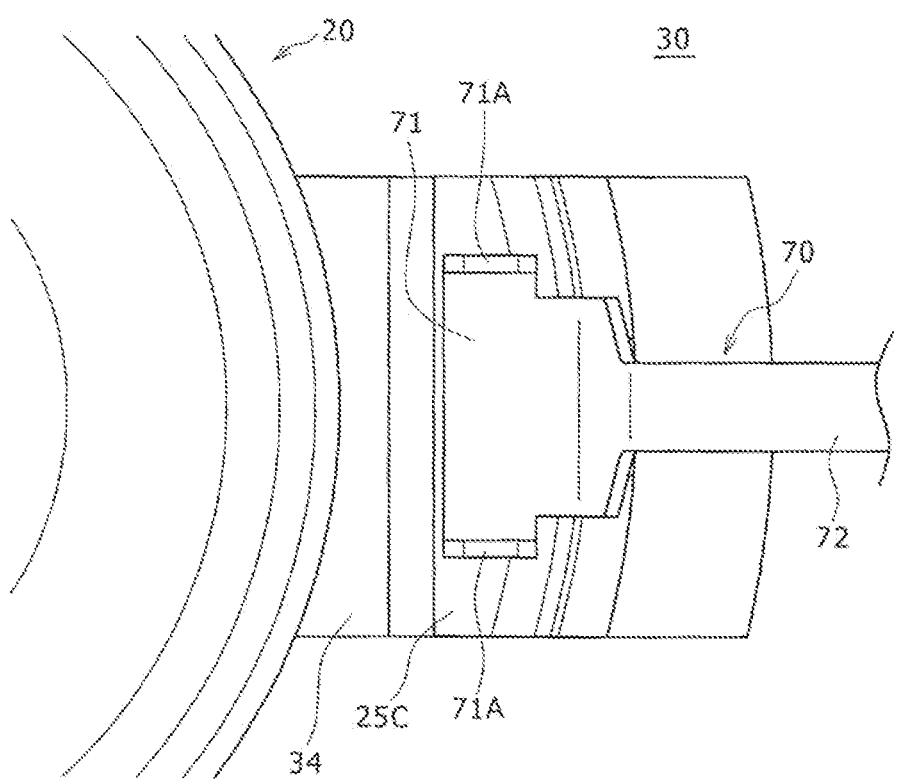
FIG. 10 is a plan view showing a negative electrode lead of the electricity storage module according to still another example of the exemplary embodiment.
Figure 11:
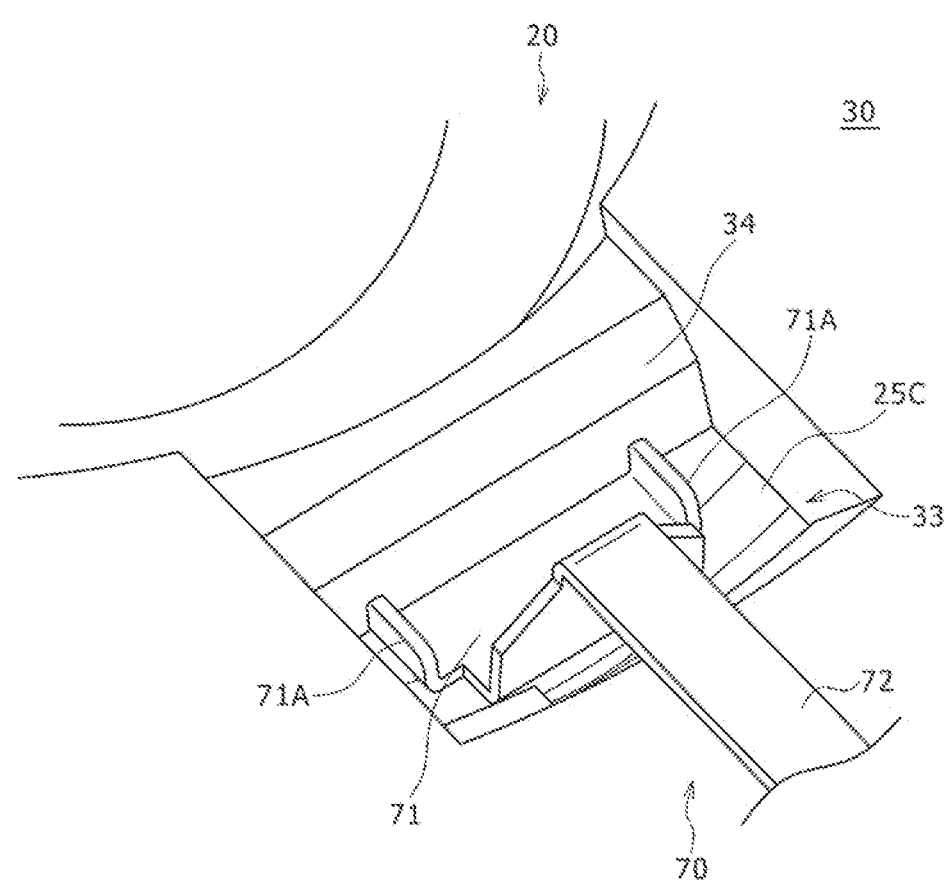
FIG. 11 is a perspective view of FIG. 10.

With reference to FIGS. 10 and 11, negative electrode lead 70 of electricity storage module 10 as still another example of the exemplary embodiment is described. FIG. 10 is a plan view showing negative electrode lead 70. FIG. 11 is a perspective view of FIG. 10.

As described above, negative electrode lead 70 is a part connected to shoulder part 25C (negative electrode terminal) of outer covering can 25 of electricity storage device 20 seen from cut-out section 33 of upper holder 30. Negative electrode lead 70 can be applied to both electricity storage module 10 having upper holder 30 and electricity storage module 10 having upper holder 60. Hereinafter, an example in which negative electrode lead 70 is applied to electricity storage module 10 having upper holder 30 is described.

In FIGS. 10 and 11, negative electrode lead 70 includes joining part 71 joined to shoulder part 25C (negative electrode terminal) of outer covering can 25 of electricity storage device 20, and connecting part 72 for connecting joining part 71 to a main body (not shown) of the second current collector. Joining part 71 includes wall part 71A formed to stand on both ends in a circumferential direction (in a broad sense, in a direction intersecting the radial direction) of electricity storage device 20. Wall part 71A is formed by, for example, bending. In wall part 71A, a separate member may be joined to both ends in the circumferential direction of connecting part 72. Furthermore, wall part 71A in the vertical direction may be higher or lower than the protrusion from cut-out section 33 on the top surface of upper holder 60. Note here that even when the size of wall part 71A in the vertical direction is smaller than a gap between electricity storage device 20 and restriction part 64, possibility of entering into the gap can be reduced as compared with the case where wall part 71A is not provided. Furthermore, when the size of wall part 71A in the vertical direction is larger than the gap, the possibility of entering into the gap can be remarkably reduced.

Even if a gap is generated between storage device 20 and ceiling part 31A of upper holder 30 by, for example, the relative positional displacement due to the dimensional tolerance of the shape of electricity storage device 20 or upper holder 30 or the assembly tolerance of storage device 20 and upper holder 30, negative electrode lead 70 can be prevented from slipping into the gap because the vertical size (height) in the vertical direction of negative electrode lead 70 is increased by wall part 71A.

On the other hand, it is also considered that a wall part is formed on the tip part of joining part 71 by bending the tip part of joining part 71 (inner end side in the radial direction). However, when a positive electrode current collector foil including the positive electrode lead, and the negative electrode current collector foil including negative electrode lead 70 are produced by punching out from one metal foil, in the metal foil before punching, the tip part of joining part 71 of negative electrode lead 70 and the tip part of the positive electrode lead are often brought into contact with each other. In such a case, it may be difficult to form a wall part on the tip part of joining part 71.

Thus, negative electrode lead 70 can be prevented from slipping under restriction part 34 by bending at least one end of joining part 71 in the circumferential direction (in a broad sense, in the direction intersecting the radial direction) to form wall part 71A.

It should be noted that the present invention is not limited to the above-described exemplary embodiments and modified examples, and various modifications and improvements can be made within the scope of matters described in the claims of the present application.

REFERENCE MARKS IN THE DRAWINGS 10 electricity storage module, 20 electricity storage device, 21 positive electrode, 22 negative electrode, 23 separator, 24 electrode group, 25 outer covering can, 25A groove, 25B protrusion, 25C shoulder part, 26 sealing body, 27 positive electrode tab, 28 gasket, 29 insulating plate, 30 upper holder, 31 housing part, 31A ceiling part, 31B wall part, 32 opening part, 33 cut-out section, 34 restriction part, 34A outside surface, 34B sloping part, 34C bottom surface, 35 pressing part, 35A recess, 35B protrusion, 36 supporting part, 40 lower holder, 50 negative electrode lead, 50A tip part, 60 upper holder, 61A ceiling part, 63 cut-out section, 64 restriction part, 64A outside surface, 64B sloping part, 64C bottom surface, 70 negative electrode lead, 71 joining part, 71A wall part, 72 connecting part

The invention claimed is:

1. An electricity storage module comprising:

at least one electricity storage device that is cylindrical; and a holder for holding one side of each of the at least one electricity storage device, wherein:

the at least one electricity storage device each include a first terminal and a second terminal on an end part of the one side, the second terminal is positioned more outside than the first terminal in a radial direction of the at least one electricity storage device, the electricity storage module further comprises a lead extending from an outside of the at least one electricity storage device in the radial direction and connected to the second terminal, the holder includes a restriction part positioned more inside than at least a part of the lead in the radial direction, and a ceiling part having a lower surface, the lower surface of the ceiling part faces the end part of the one side of the at least one electricity storage device, the restriction part includes a bottom surface, and a bottommost end of the bottom surface is located below the lower surface of the ceiling part and closer to the end part of the one side of the at least one electricity storage device than the lower surface.

2. The electricity storage module according to claim 1, wherein the holder includes an opening part for exposing the first terminal, and a cut-out section disposed in a surrounding of the opening part and exposing the second terminal, and the restriction part extends from one side of the cut-out section.

3. The electricity storage module according to claim 1, wherein the one end of the one side of the at least one electricity storage device and the bottom surface of the restriction part are brought into contact with each other.

4. An electricity storage module comprising:

at least one electricity storage device that is cylindrical; and a holder for holding one side of the at least one electricity storage device, wherein:

the at least one electricity storage device includes a first terminal and a second terminal on an end part of the one side, the second terminal is positioned more outside than the first terminal in radial direction of the at least one electricity storage device, the electricity storage module further comprises a lead extending from an outside of the at least one electricity storage device in the radial direction and connected to the second terminal, the holder includes a restriction part for restricting the lead to be positioned more outward than a predetermined position in the radial direction, the lead includes a joining part to be joined to the second terminal, and the joining part includes a wall part.

5. The electricity storage module according to claim 4, wherein the wall part is disposed on both ends of the joining part in a direction intersecting the radial direction of the at least one electricity storage device.

*    *    *    *    *